July 8, 1941. G. W. THOMPSON, JR 2,248,519
PICKUP HAY BALER
Filed July 24, 1940 2 Sheets-Sheet 1
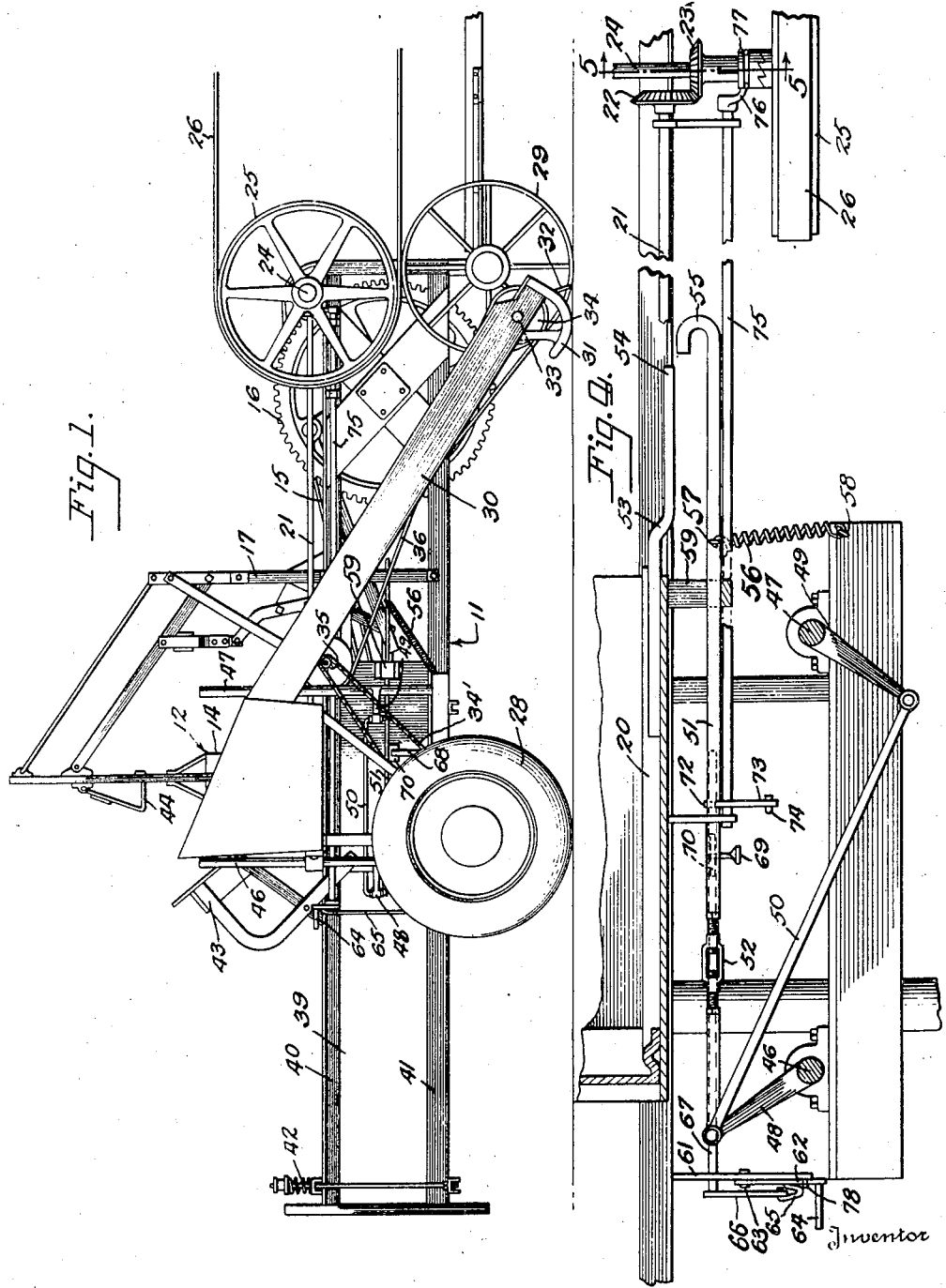
Inventor
G. W. Thompson, Jr.
By Mason Fenwick & Lawrence
Attorneys July 8, 1941.  G. W. THOMPSON, JR  2,248,519
PICKUP HAY BALER
Filed July 24, 1940  2 Sheets-Sheet 2
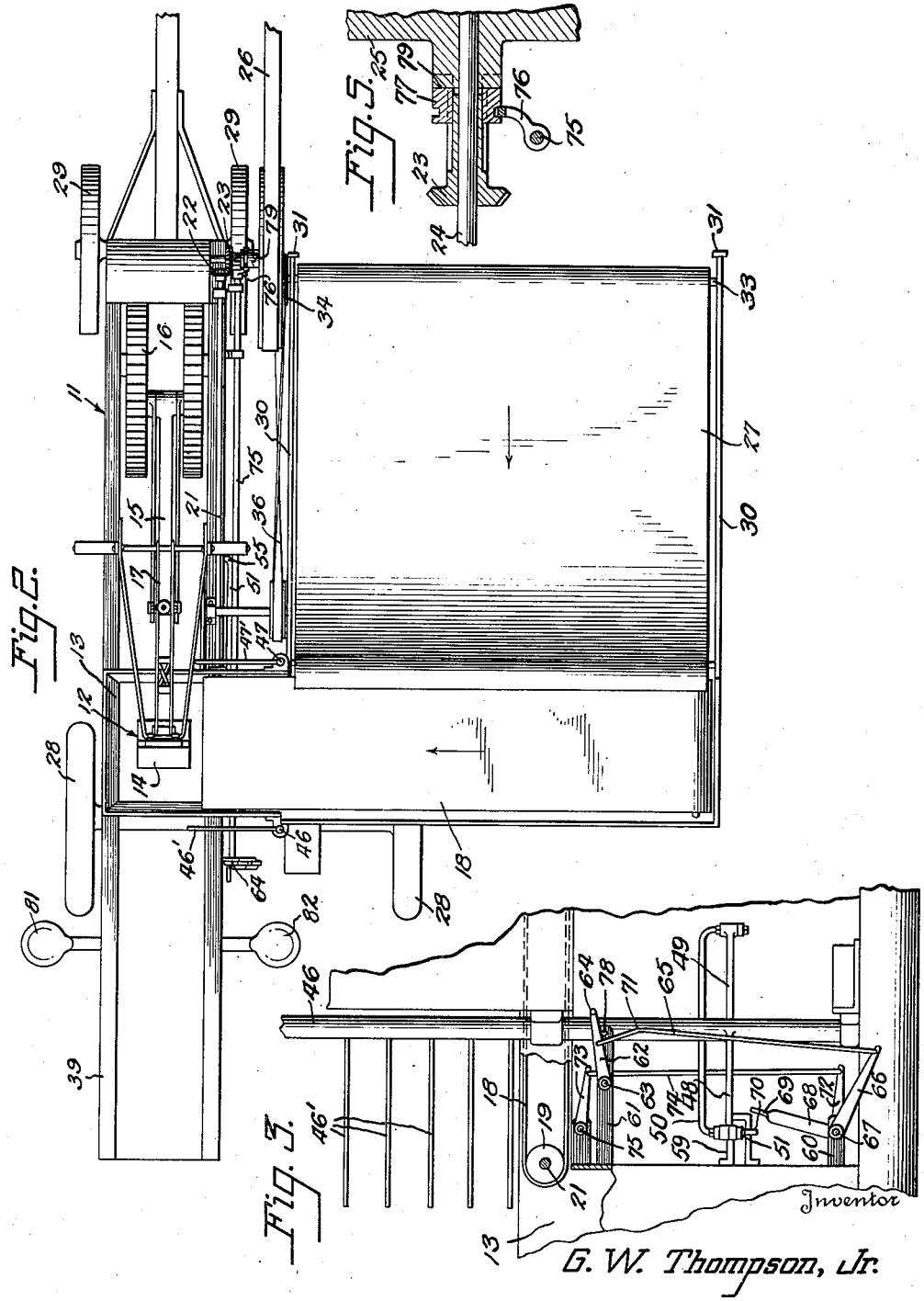
Inventor
G. W. Thompson, Jr.
By Mason Fenwick & Lawrence
Attorneys Patented July 8, 1941

2,248,519

UNITED STATES PATENT OFFICE 2,248,519

PICKUP HAY BALER

George W. Thompson, Jr., Owensboro, Ky.

Application July 24, 1940, Serial No. 347,291

7 Claims. (Cl. 100—25)

The invention pertains to agricultural implements for baling hay and the like material, and is especially directed to mechanism for conveying the material to the baler.

The baler of the conventional prior art practice comprises a feeder member which reciprocates up and down into the hopper, during each down stroke engaging the mass of material delivered to the hopper to project it downwardly into the press chamber and compress it therein. A horizontally reciprocating plunger operates to compress the bale longitudinally, the down stroke of the feeder member being timed with the retraction of the plunger. Under conventional practice the material is delivered to the hopper by hand, while the feeder member is in its upper retracted position.

One object of the present invention is to eliminate the manual operation of conveying material to the hopper and to the feeding member. Pursuant to this purpose the invention comprises a conveyor member for collecting the material as the baler is transported through the field and to convey it to the hopper in position to be operated upon by the feeder member.

An additional object of the invention is to discontinue the delivery of material to the hopper at predetermined intervals, when a bale is to be bound and completed. Pursuant to this purpose the invention includes mechanism to stop the delivery of material to the hopper, and to part the mass of material where it enters the hopper at the edge thereof, the mechanism operating to sweep the excess material back out of the way of the feeder member. The delivery mechanism is interconnected with the baling mechanism to time the interruption of delivery of material with the formation of the bale.

The mechanism for operating the conveyor and for separating the mass of materials, and the interconnecting mechanism, is of simple construction and operation and of low cost. It adds little to the cost of the baler and lowers its cost of operation. The operating parts provide a minimum of parts which operate for only a fraction of the time the baler is operating. The movable device is easily handled and reduces the manual labor necessary to produce bales. Other advantages will appear from an understanding of the preferred embodiment of the invention shown in the drawings, of which Figure 1 is a side elevation of the machine;

Figure 2 is a plan view of the machine;

Figure 3 is a detailed end view showing the operating mechanism;

Figure 4 is a detailed plan view; and

Figure 5 is a cross sectional elevation taken on line 5—5 of Figure 4.

The machine of the invention comprises a baler, designated generally by the reference character 11, which may be of standard and well known construction. In its essential elements the baler consists of a feeding member 12, operated to reciprocate vertically downwardly into and upwardly out of the hopper 13. The feeding member comprises the head 14 which engages the mass of material delivered to the hopper and projects it downwardly therein and into the press chamber below with each downward stroke of the feeding member. Illustrated in Figure 2 is the pitman 15 driven from the gear 16 to reciprocate horizontally to drive a plunger 20 which compresses the bale longitudinally. An interdrive 17 between the pitman 15 and the feeding member 12 functions to time the operation of the feeding member in its downward stroke with the retraction stroke of the plunger. The mechanism of the baler, per se, is old and of well known construction, and further description thereof is not required herein.

The present invention is directed to the mechanism for delivering material to the hopper 13. It comprises the cross conveyor 18 which moves transversely of the machine and which rides on the drum 19, Figure 3, positioned adjacent to the hopper. A companion drum, not shown, cooperating with drum 19 determines the level of the conveying surface of 18. The drum 19 is keyed to the longitudinal shaft 21 which carries the driven beveled pinion 22 in mesh with the driving beveled gear 23. The driving gear 23 is mounted to rotate freely on the drive shaft 24 which carries the pulley 25 keyed thereto. The shaft 24 is driven from any suitable source of power, for example, through the power transmission belt 26.

The transverse conveyor 18 receives the hay or similar material from the pickup conveyor 27 disposed longitudinally of the machine and of the direction of travel thereof as determined by the wheels 28 and 29. The pickup conveyor is mounted on the beam 30 as a support, the lower extremity of the beam being equipped with the skid 31 which slides along the ground as the machine is transported through the fields. The rake-like member 32 operates to accumulate and pile the material to be baled, and to deposit it onto the pickup conveyor 27. The pickup conveyor 27 travels on lower and upper drums, not shown, the lower drums rotating on the pivot 33 with the pulley 34 driven from the rear wheels 28 of the machine by means of the intermediate chain 34' and sprocket 35, and the belt 36.

As the material is picked up from the field it rides up the conveyor 27 and onto the cross conveyor 18 which operates to carry the material to the hopper 13. The feeding member or tamper 12 operates to project material downwardly into the hopper as the material is delivered to the hopper by the cross conveyor 18 and to compress it. When sufficient material has been fed to the hopper for a bale, the bale formed in the well known manner, it is projected out of the hopper from a side thereof into the discharge member 39. The discharge member 39 holds the bales between the upper and lower platens 40 and 41 which are yieldingly urged towards each other by means of the springs 42, which hold the bales under pressure until they are discharged from the machine.

The blocksetter 43, so-called, is thrown forward of the machine in position to be engaged by the projecting arms 44 of the feeding member 12, which projects a block downwardly into the hopper in position to oppose the plunger 20 to compress the material therebetween. This operation is manually controlled and is performed upon a bale being completed when a new bale is to be formed.

The present invention comprises mechanism to interrupt the drive of the cross conveyor 18 at the time when a bale is to be completed. It also includes mechanism to separate the mass of material at the edge of the hopper 13 where it leaves the cross conveyor 18 to enter the hopper to present additional material to be drawn into the hopper by the action of the feeding member 12. By means of the device of the invention the material to comprise a given bale is determined, and no additional material comes under the action of the feeding member 12 and the plunger 20.

In accordance with the preferred embodiment of the invention shown, the mechanism for separating the mass of material comprises gatelike elements which swing on the upright pivots 46 and 47. Tines 46' and 47' are spaced apart along the respective pivots 46 and 47. The pivots 46 and 47 are adapted to rotate in opposite directions to sweep across the top surface of the cross conveyor 18 to sweep the material back on the conveyor 18 and away from the edge of the hopper out of position to be actuated by the feeder member 12. The tines 46' and 47' are long enough to overlap at the center of the conveyor 18, and are positioned along the respective pivot rods 46 and 47 in staggered relationship to avoid interference with each other.

The pivot 46 carries the lever arm 48 and the pivot 47 carries the lever arm 49, the respective arms 48 and 49 being interconnected by the connecting link 50 which causes the respective pivots 46 and 47 to rotate in opposite directions. Thus, as viewed in Figure 4, when the pivot 46 rotates in the clockwise direction, the pivot 47 is rotated in the counterclockwise direction. Also connected to the arm 48 is the slide rod 51 which swivels at its point of connection with the arm 48. The slide rod 51 rests on the slide bearing 59, which is wide enough to permit movement of the slide rod sideways. The slide rod 51 is provided with an adjustment 52 to vary its length, in accordance with the stroke required to swing the pivots 46 and 47. Attached to the plunger 20 to reciprocate therewith is the abutment arm 53 the end 54 of which is adapted to engage the hook 55 at the end of the slide rod 51 when the slide rod 51 is shifted sideways to position the hook into the path of the abutment arm 53. The tension spring 56 is connected between the slide rod 51 at 57 and a fixed portion of the machine at 58, and tends to hold the slide rod 51 in position to position the hook 55 out of the path of the abutment arm 53.

As most clearly illustrated in Figure 3, there is provided the lower and upper bearing brackets 60 and 61, respectively. The bracket 61 carries the lever 62 pivoted thereon at 63, the lever 62 being provided with the handle 64 for manual operation. The draw rod 65 connects the lever 62 with the lever 66 keyed to the shaft 67 which rotates in the bearing bracket 60. Also keyed to the shaft 67 is the lever 68 which carries the abutment finger 69 movable into the path of the abutment 70 projecting downwardly from the slide rod 51.

When the lever 62 is thrown forward, in the counterclockwise direction in Figure 3, it is able to move until the angle 71 in the draw rod 65 engages the pivot pin 63 and rests against it. This movement of the lever 62, by manual manipulation of the handle 64, operates to actuate the lever 66 to rotate the shaft 67 in the counterclockwise direction, swinging the lever 68 to cause the abutment finger 69 to engage and actuate the abutment 70. This action shifts the slide rod 51 against the tension of the spring 56 to position the hook 55 in the path of the abutment arm 53. On the next retracting stroke of the plunger 20 the end 54 of the abutment arm 53 engages the hook 55 and slides the rod 51 a distance determined by the adjusted length of the rod 51 and the stroke of the plunger 20. In this manner the upright pivots 46 and 47 are rotated and the tines 46', 47' swing across the surface of the cross conveyor 18 to push the material back, away from the edge of the hopper where it is out of position to be acted upon by the feeding member 12 as it moves.

Keyed to the rock shaft 67 is the lower lever 72 connected to the upper lever 73 by means of the connecting rod 74. Thus, when the hand operated lever 62 is thrown forward in Figure 3, the lever 73 is rotated in the counterclockwise direction to rotate the rod 75. The rod 75 extends along the length of the machine and carries the clutch fork 76 attached to its opposite end. The clutch fork 76 straddles the clutch collar 77, Figure 4, to disengage the clutch when the rod 75 is rotated by the handle 64 being moved to the left of the Figure 3. This operation disconnects the drive between the pulley 25 and the driving gear 23 which interrupts the drive of the cross conveyor 18.

Viewing Figure 3, when the hand operated lever 62 is thrown to the right its movement is limited by the stop pin 78 which projects laterally from the bearing bracket 61. The stop pin 78 is so positioned that, when engaged by the lever 62, the clutch collar 77 is in engagement to drive the shaft 24 and the shaft 21 to operate the cross conveyor 18.

In practice the baler operates continuously, the feeding member 12 reciprocating up and down to project material as fed to the hopper 30 into and through the hopper into the press chamber. Operating in timed relationship therewith, the pitman 15 reciprocates the plunger 20 horizontally to compress the bale longitudinally. At the completion of a bale, i. e., when sufficient material has been delivered to the hopper and the feeding member 12 to produce a bale of the desired size, the attendant sitting at the seat 81, the upper seat in Figure 2, projects the wire through the baler to be reached by the attendant sitting in the seat 82, who wires the bale.

Before the baler is to be blocked, the attendant throws the lever 62 forward in Figure 3 to disengage the clutch 79 and interrupt the drive of the cross conveyor 18.

Actuation of the lever 62 forward also throws the hook 55 into position to be actuated by the abutment arm 53 on the next retracting stroke of the plunger 20, which action causes the pivots 46 and 47 to rotate in opposite directions to separate the material at the edge of the hopper and to sweep whatever material remains at the end of the conveyor 18 back away from the hopper and away from the position to be acted upon by the downward movement of the feeding member 12. The material is therefore parted after movement of the conveyor 18 has been discontinued. The tines 46' and 47' engage the material and pull it against the pull exerted on the material by the downward stroke of the feeding member 12. The downward stroke of the feeding member 12 takes place simultaneously with retraction of the plunger 20, and accordingly simultaneously with the movement of the tines 46' to 47'. The material is thus parted at the edge of the hopper 13 and whatever material is not projected into the hopper by the feeding member 12 is pushed backwardly on the conveyor 18 away from the position to be actuated by the feeding member.

Upon moving the lever 62 forward, as described, the attendant in seat 82 moves the blocksetter 43 into position to be engaged by the projecting arms 44 of the feeding member 12 at the time when the feeding member makes its next succeeding downward stroke and the machine is ready to begin the production of another bale. The attendant in the seat 81 removes the block released by the completion of a bale and positions it into the blocksetter 43 which has been retracted to the position shown in Figure 1 awaiting the time when another bale is to be started. The attendant in the seat 82 then draws the lever 62 to the left in Figure 3 and into engagement with the stop pin 78. This action engages the clutch 77 to resume movement of the transverse conveyor 18. It also permits the tension spring 56 to retract the slide rod 51 to remove the hook 55 from position to be engaged by the abutment arm 53 upon the continued reciprocation of the plunger 20. While the transverse conveyor 18 is idle the pickup conveyor 27 continues to operate and the material is massed on the conveyor 18. Upon the resumption of movement of the conveyor 18 the material actuates the tines 46' and 47' to swing the pivots 46 and 47 in the opposite direction and to retain the operating mechanism, including the rod 51, into position for the next operation by actuation of the lever 62 to the left in Figure 3.

The mechanism for discontinuing delivery of material to the baler is movable to two positions only, the hand lever 62 being movable to the left and right positions in Figure 3, and the slide rod 51 being moved to the left or right in Figure 4. These movements take place only once during the production of each bale because when the abutment arm 53 has actuated the slide rod 51 to the right in Figure 4, rod 51 will remain in that position while the plunger 20 continues to reciprocate, and until such time when the clutch 77 has been reengaged. This is because abutment finger 69 slides past the edge of abutment 70, under pressure from the handle 64 and its connections, when the rod 51 has once been moved to its extreme position at the right in Figure 4. Thus the rod 51 is held at that extreme right position until abutment finger 69 is retracted under control of handle 64. This release of abutment finger 69 past the edge of abutment 70 also permits spring 56 to retract rod 51 from the path of arm 53. In this retraction rod 51 may swing about its fixed end.

The function of spring 56 is to draw rod 51 toward the spring and thus retract it from the path of rod 54. The spring is mounted so that its movable end is not drawn to any extreme extent out of line with its point of fastening to the frame. The spring 56 furthermore preferably is a light spring adapted to its function of withdrawing the rod 51 from the path of rod 54. In any event, the spring 56 exerts a negligible effect to pull rod 51 to the left, indicated in Figure 4, because to move rod 51 to the left requires overcoming the friction and resistance or inertia of the hay gates and if the associated linkage pivots. The rod 51 with its abutment 70 is returned to the left so that the abutment 70 is in alignment with finger 69, that is to the initial position, only by resumption of operation of the driving clutch 77, brought about by the operator by means of clutch control lever 62. When the driving clutch 77 is thus engaged the gate is opened by the incoming hay, and thus rod 51 is returned to initial position. The invention shown in the drawings, and described in detail, is susceptible of a number of modifications without departing from the spirit and scope of the invention. Accordingly, applicant is not limited to the specific structure disclosed but his invention is measured by the accompanying claims.

What I claim is:

1. In a baler for hay and the like material comprising, a baling mechanism including a plunger, a hopper associated therewith, and a conveyor to deliver the material to the hopper in a continuous mass, a drive mechanism for the conveyor, a clutch to disconnect the conveyor drive to interrupt operation thereof, mechanism sweepable horizontally across the conveyor feed to separate the mass of material at the edge of the hopper, and interconnecting mechanism between the conveyor drive mechanism and the separating mechanism to separate the material at the time when the operation of the conveyor is interrupted, the improvement in interconnecting mechanism comprising a slide rod operable during the production of each bale, slidable in one position to operate the separating mechanism and to another position upon resumption of operation of the conveyor drive mechanism.

2. In a baler having a baling chamber and a horizontal plunger operated therein, and means to convey feed material to the baling chamber and a gate movable into the path of the feed to separate the feed from material in the chamber, and means to stop the flow of feed; means to close the gate on stopping of the feed, directly connecting the plunger with the gate during one stroke of the plunger and operable by the horizontal plunger.

3. In a baler having a baling chamber and a horizontal plunger operated therein, and means to convey feed material to the baling chamber and a gate movable into the path of the feed to separate the feed from material in the chamber, and means to stop the flow of feed; means to close the gate on stopping of the feed operable by the horizontal plunger to close the gate, the gate-closing means comprising a rod linked to the gate and having a finger movable into position to be operated by the plunger, and means to retract the rod finger out of operative position with respect to the plunger after one operation by the plunger.

4. In a baler comprising a baling chamber and a baling plunger, and feeding means and a gate closure for the feed, the improvement in means to close the gate comprising a rod linked to the gate and pivotally mounted to be pushed into position to be drawn by a stroke of the plunger, and means to push said rod, said means being arranged to become inoperative at the extreme position of the stroke, and means on release of the pressure to retract the rod from operative relation to the plunger.

5. In a baler having a baling chamber, a plunger operable therein and a feeder therefor, and a gate movable into the path of feed, the improvement comprising means to actuate the gate including mechanism operable by the plunger to close the gate, said mechanism including means to interrupt operation of the mechanism by the plunger.

6. In a baler having a baling chamber, a plunger operable therein and a feeder therefor, and a gate movable into the path of feed, the improvement comprising mechanism to close the gate including a rod pivotally linked to the gate and swingable about its pivot into position to be drawn away from the gate by the plunger and a finger movable to swing the rod about its pivot into operative relation to the plunger, and means to cause movement of the finger out of operative position at the end of a stroke of the plunger, and means operative after said movement to return the rod to inoperative position.

7. In a baler having a baling chamber, a plunger operable therein and a feeder therefor, and a gate movable into the path of feed, the improvement comprising mechanism to close the gate including a rod pivotally linked to the gate and swingable about its pivot into position to be drawn away from the gate by the plunger, a limited bearing portion of limited extent on the rod and a finger operative to press against the bearing portion to pivot the rod into operative relation to the plunger and adapted at the end of the plunger stroke to move out of contact with the bearing portion, and means to remove the rod from operative relation to the plunger after the finger moves from the bearing portion.

GEORGE W. THOMPSON, Jr.